United States Patent
Lee et al.

(10) Patent No.: US 10,808,711 B2
(45) Date of Patent: Oct. 20, 2020

(54) COMPRESSOR AND THE COMPRESSOR CONTROLLING METHOD

(71) Applicant: LG ELECTRONICS INC., Seoul (KR)

(72) Inventors: Namsoo Lee, Seoul (KR); Solji Ryu, Seoul (KR); Kiwook Lee, Seoul (KR); Seongmin Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 585 days.

(21) Appl. No.: 15/684,557

(22) Filed: Aug. 23, 2017

(65) Prior Publication Data

US 2018/0058460 A1 Mar. 1, 2018

(30) Foreign Application Priority Data

Aug. 24, 2016 (KR) .................. 10-2016-0107901

(51) Int. Cl.
*F25B 49/02* (2006.01)
*F04D 27/00* (2006.01)
(Continued)

(52) U.S. Cl.
CPC ......... *F04D 27/001* (2013.01); *F04D 29/053* (2013.01); *F04D 29/058* (2013.01); *F04D 29/286* (2013.01); *F25B 31/026* (2013.01); *F25B 49/025* (2013.01); *G01B 7/14* (2013.01); *F25B 1/053* (2013.01); *F25B 39/00* (2013.01); *F25B 2339/0242* (2013.01); *F25B 2339/047* (2013.01); *F25B 2400/077* (2013.01)

(58) Field of Classification Search
CPC .... F04D 29/058; F04D 29/286; F04D 29/053; F25B 2400/077; F25B 49/025; F25B 31/026; G01B 7/14; F16C 32/0406; H02K 7/09; F05B 2240/50
See application file for complete search history.

(56) References Cited

U.S. PATENT DOCUMENTS

| | | | |
|---|---|---|---|
| 2014/0234139 A1* | 8/2014 | Sakawaki | F04D 29/058 417/410.1 |
| 2014/0363321 A1* | 12/2014 | Sakawaki | F04D 29/058 417/423.12 |
| 2017/0097006 A1* | 4/2017 | Hossain | F04D 27/0246 |

FOREIGN PATENT DOCUMENTS

| | | |
|---|---|---|
| CN | 103201529 A | 7/2013 |
| CN | 104024667 A | 9/2014 |

(Continued)

*Primary Examiner* — Muhammad S Islam
(74) *Attorney, Agent, or Firm* — Birch, Stewart, Kolasch & Birch, LLP

(57) ABSTRACT

The present invention provides a compressor that includes: one or more impellers that axially suck and centrifugally compress a refrigerant; a rotary shaft that is connected with the impeller and a motor for rotating the impeller; a plurality of magnetic bearings that supports the rotary shaft in the air so that the rotary shaft can rotate; a gap sensor that senses the distance from the rotary shaft; and a controller that determines abnormal wire connection of the magnetic bearings on the basis of information from the gap sensor. The controller can sense movement of the rotary shaft through the gap sensor while controlling the amount of current supplied to any one of the magnetic bearings and can determine whether there is abnormal wire connection on the basis of the information.

19 Claims, 16 Drawing Sheets

(51) Int. Cl.
*F04D 29/053* (2006.01)
*F04D 29/058* (2006.01)
*F04D 29/28* (2006.01)
*F25B 31/02* (2006.01)
*G01B 7/14* (2006.01)
*F25B 1/053* (2006.01)
*F25B 39/00* (2006.01)

(56) References Cited

FOREIGN PATENT DOCUMENTS

| | | | |
|---|---|---|---|
| CN | 104879383 A | 9/2015 | |
| JP | 7-91760 A | 4/1995 | |
| JP | 2004-316756 A | 11/2004 | |
| JP | 2012-172756 A | 9/2012 | |
| KR | 10-2006-0000539 A | 1/2006 | |
| KR | 10-2015-0078944 A | 7/2015 | |

\* cited by examiner

COMPRESSOR AND THE COMPRESSOR CONTROLLING METHOD

CROSS-REFERENCE TO RELATED APPLICATIONS

This application claims priority to Korean Patent Application No. 10-2016-0107901 filed on 24 Aug. 2016 in Korea and the entire contents of which are hereby incorporated by reference in its entirety under Articles 119 (35) and 365 (35) of the U.S. Patent Law.

BACKGROUND

The present invention relates to a compressor including a magnetic bearing and a method of controlling the compressor.

A compressor, which is a machine that compresses fluid such as a refrigerant gas, can be classified into a centrifugal compressor, a rotary compressor, a reciprocating compressor, and a scroll compressor, depending on the type of compressing liquid.

A centrifugal compressor, which compresses fluid by axially sucking liquid and then centrifugally discharging the fluid using torque from an impeller, may include an impeller and a motor for rotating the impeller.

Centrifugal compressors can fall into a one-step type and a two-step type, depending on the number of compression chambers, and can be classified into a back-to-back type and a face-to-face type, depending on the arrangement type of impellers.

Meanwhile, compressors can be installed in various air conditioners or chiller systems and compress a refrigerant gas etc. to fit to the uses.

A chiller system, which is a cooling facility or a freezing facility for supplying cooling water to apparatuses that require cooling water such as an air conditioner or a freezer, may include a compressor, a condenser, an expansion valve, and an evaporator, in which a refrigerant can circulate through the compressor, condenser, expansion valve, and evaporator.

The condenser may be a water-refrigerant heat exchanger and can cool a refrigerant with cooling water through heat exchange between a refrigerant passing through the condenser and cooling water that has exchanged heat through a cooling water cooler.

The evaporator may be a water-refrigerant heat exchanger and can cool cold water with a refrigerant through heat exchange between a refrigerant passing through the evaporator and cold water coming out of the heat exchanger of an air conditioner or a freezer.

The compressor can compress and supply a refrigerant to the condenser.

The compressor may include an impeller that compresses a refrigerant, a rotary shaft that is connected to the impeller, and a motor that rotates the rotary shaft. A bearing unit for rotatably supporting the rotary shaft may be disposed in the compressor.

SUMMARY

An object of the present invention is to provide a compressor that can sense whether a wire is abnormally connected to a coil of a magnetic bearing, and a method of controlling the compressor.

Another object of the present invention is to provide a compressor that can sense that a coil has been wound in an opposite direction on a magnetic bearing, and a method of controlling the compressor.

Another object of the present invention is to provide a compressor that can sense that a magnetic bearing has been turned over, and a method of controlling the compressor.

A compressor according to an aspect of the present invention includes: one or more impellers that axially suck and centrifugally compress a refrigerant; a rotary shaft that is connected with the impeller and a motor for rotating the impeller; a plurality of magnetic bearings that supports the rotary shaft in the air so that the rotary shaft can rotate; a gap sensor that senses the distance from the rotary shaft; and a controller that determines abnormal wire connection of the magnetic bearings on the basis of information from the gap sensor, in which controller senses movement of the rotary shaft through the gap sensor while controlling the amount of current supplied to any one of the magnetic bearings and determines whether there is abnormal wire connection on the basis of the information.

When determining that there is abnormal wire connection in a magnetic bearing, the controller may supply a current to two adjacent magnetic bearings of the magnetic bearings.

The controller may reduce step by step the current applied to any one of the two adjacent magnetic bearings, and may sense the position of the rotary shaft using the gap sensor every time the current is reduced step by step.

The controller may reduce step by step the current applied to any one of the two adjacent magnetic bearings after applying the same amount of current to the two adjacent magnetic bearings.

The gap sensor may be disposed between two adjacent magnetic bearings.

The magnetic bearings may be arranged around the rotary shaft and at least two gap sensors may be installed.

The gap sensor may include: a first gap sensor for measuring first-directional movement of the rotary shaft; and a second gap sensor for measuring second-directional movement of the rotary shaft, and the first direction and the second direction may be perpendicular to each other.

When the direction of a center vector of the rotary shaft measured by the first gap sensor and the second gap sensor is changed, the controller may determine normal wire connection of the magnetic bearings.

When the direction of a center vector of the rotary shaft measured by the first gap sensor and the second gap sensor is not changed, the controller may determine that there is abnormal wire connection in a magnetic bearing.

The magnetic bearings may each have: a magnetic bearing body forming the body of the magnetic bearings; a first coil winding portion extending toward the rotary shaft from an end of the magnetic bearing body; a second coil winding portion extending toward the rotary shaft from another end of the magnetic bearing body; and coils wound on the first coil winding portion and the second coil winding portion and allowing a current to flow.

The coils may be wound such that a magnetic field generated around the first coil winding portion faces the rotary shaft and the a magnetic field generated around the second coil winding portion faces away from the rotary shaft.

The first coil winding portion of any one of the magnetic bearings may be adjacent to the first coil winding portion of another magnetic bearing.

When the direction of the magnetic field generated around the first coil winding portion of any one of the magnetic bearings and the direction of the magnetic field generated around the first coil winding portion of another magnetic bearing are the same, the controller may determine normal wire connection.

When the direction of the magnetic field generated around the first coil winding portion of any one of the magnetic bearings and the direction of the magnetic field generated around the first coil winding portion of another magnetic bearing are different, the controller may determine that there is abnormal wire connection of a magnetic bearing.

Another aspect of the present invention provides a method of controlling a compressor for sensing a defect of the compressor including an impeller for compressing a refrigerant, a rotary shaft for rotating the impeller, a gap sensor for sensing the position of the rotary shaft, and a controller determining whether there is abnormal wire connection in a magnetic bearing. The method includes: supplying a current to adjacent two magnetic bearings; and reducing step by step the current supplied to any one of the two magnetic bearings.

The amounts of supplied current may be the same in the supplying of a current to the adjacent two magnetic bearings.

In the reducing of the current step by step, the gap sensor may measure the position of the rotary shaft every time the current is reduced step by step.

The gap sensor may include: a first gap sensor for determining first-directional movement of the rotary shaft; and a second gap sensor for determining second-directional movement of the rotary shaft, and the first direction and the second direction may be perpendicular to each other.

When the direction of a center vector of the rotary shaft measured by the first gap sensor and the second gap sensor is changed, the controller may determine normal wire connection.

When the direction of a center vector of the rotary shaft measured by the first gap sensor and the second gap sensor is not changed, the controller may determine that there is abnormal wire connection of a magnetic bearing.

According to the present invention, it is possible to sense whether wires are abnormally connected to the coils wound on a magnetic bearing.

Further, according to the present invention, it is possible to sense that a coil is wound in the opposite direction.

Further, according to the present invention, it is possible to sense that a magnetic bearing has been turned over.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE EMBODIMENTS

Figure 1:
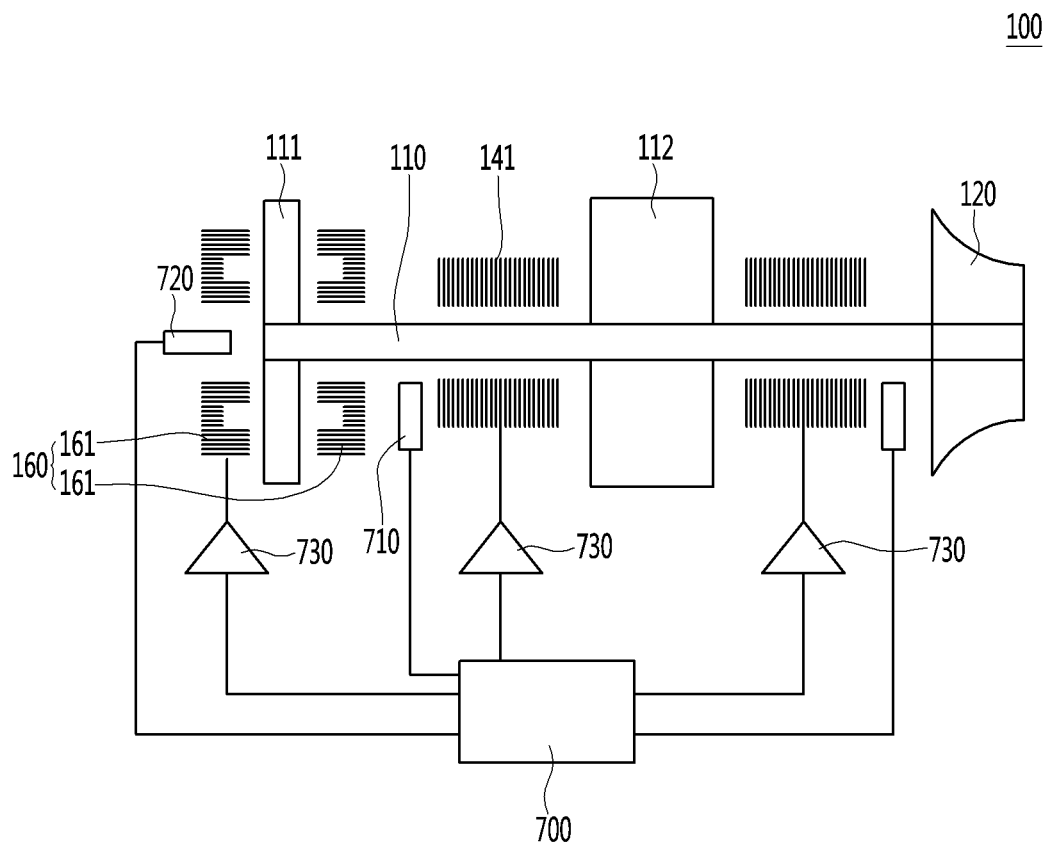
FIG. 1 is a view showing the configuration of a compressor according to an embodiment of the present invention.

Hereinafter, preferred embodiments of the present invention will be described with reference to the accompanying drawings. The configuration or a control method of an apparatus to be described below is provided only for explaining embodiments of the present invention and do not limit the scope of the present invention. Further, like reference numerals indicate like components through the following description.

FIG. 1 is a view showing the structure of a compressor according to an embodiment of the present invention.

A compressor 100 may include a plurality of magnetic bearings 141 on a rotary shaft 110. The magnetic bearings 141, which are bearings supporting the rotary shaft 110 using a magnetic reaction force, have a friction force smaller than that of a ball bearing or a rolling bearing.

The magnetic bearings 141 may each include a wound coil.

The coils of the magnetic bearings 141 are wound in the opposite direction or a wire is abnormally connected to the coils, a current may flow in the opposite direction through the coils. In this case, the magnetic fields that are generated by the magnetic bearings 141 and the coils may be changed in the opposite direction, and the magnetic fields may be unbalanced when the rotary shaft is supported in the air.

This embodiment may include a sensor that can sense whether a magnetic field has been changed and the sensor may include a gap sensor 710 that senses the distance between the rotary shaft 110 and the sensor.

The compressor 100 shown in FIG. 1 includes: one or more impellers 120 that axially suck a refrigerant and centrifugally compress the refrigerant; a rotary shaft 110 that is connected with the impeller 120 and a motor 130 (see FIG. 2) for rotating the impeller 120; a plurality of magnetic bearings 141 that supports the rotary shaft 110 in the air so that the rotary shaft 110 can rotate; bearing units 140 (see FIG. 2) each including a bearing housing 142 (see FIG. 2) for supporting the magnetic bearings 141; and a gap sensor 71 that is disposed between the magnetic bearings 141 and senses the distance from the rotary shaft 110.

The impeller 120 generally has one step or two steps, but it may have a plurality of steps. The impeller 120 can be rotated by the rotary shaft 110 and can compress a refrigerant at a high pressure by centrifugally compressing the refrigerant axially sucked inside.

The motor 130 has a rotary shaft separately from the rotary shaft 110, can transmit torque to the rotary shaft 110 through a belt (not shown). Further, the motor 130 includes a stator (not shown) and a rotor 112 connected to the rotary shaft 110, so it can rotate the rotary shaft 110.

The magnetic bearings 141 and the rotary shaft 110 may be conductors and the magnetic bearings 141 may include wound coils 143. The magnetic bearings 141 can function as magnets by a current flowing through the wound coils 143.

A plurality of magnetic bearings 141 may be disposed around the rotary shaft 110.

The magnetic bearings 141 can allow the rotary shaft 110 to rotate without friction in the air. Three or more magnetic bearings 141 may be disposed around the rotary shaft 110 and each of the bearings 141 should keep balance around the rotary shaft 110.

For example, the compressor may include four magnetic bearings 141 symmetrically arranged around the rotary shaft 110 and the rotary shaft 110 can be supported in the air by magnetic forces generated by the wound coils of the magnetic bearings 141. Since the rotary shaft 110 is rotated in the air, a loss due to friction can be minimized, as compared with other bearings such as a ball bearing.

Figure 3:
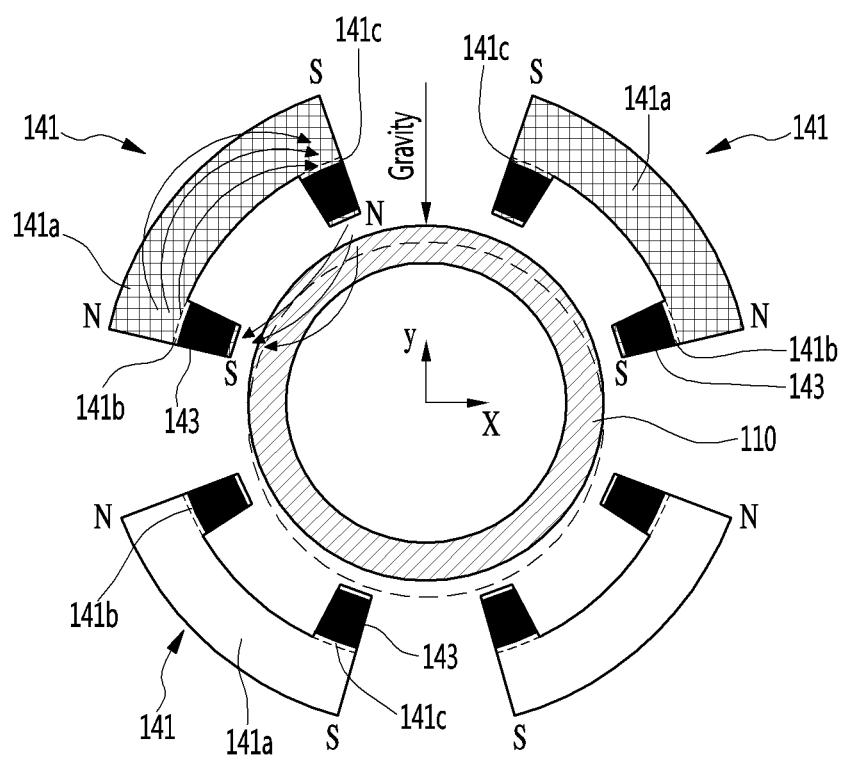
FIG. 3 is a view showing normal wire connection of a magnetic bearing according to an embodiment of the present invention.

Referring to FIG. 3, the magnetic bearings 141 according to this embodiment each may have a magnetic bearing body 141a that is the main body of the magnetic bearings 141 and first and second coil winding portions 141b and 141c that extend toward the rotary shaft 110 from both ends of the magnetic bearing body 141a. The magnetic bearings 141 may have a substantially U-shape, the magnetic bearing body 141a, the first coil winding portion 141b, and the second coil winding portion 141c all may be positioned in the same plane, and the first coil winding portion 141b and the second coil winding portion 141c may be spaced from each other.

The first coil winding portion 141b may extend toward the rotary shaft 110 from a first end of the magnetic bearing body 141a.

The second coil winding portion 141c may extend toward the rotary shaft 110 from a second end of the magnetic bearing body 141a.

A coil 143 is wounded on each of the first coil winding portion 141b and the second coil winding portion 141c. When a current is applied to the wound coils 143, the first coil winding portion 141b and the second coil winding portion 141c can become electric magnets.

A current can be applied to the coils 143 of each of the magnetic bearings 141 such that the magnetic pole generated at the portion, which is close to the rotary shaft 110, of the first coil winding portion 141b and the magnetic pole generated at the portion, which is close to the rotary shaft 110, of the second coil winding portion 141c can be opposite to each other.

The coils 143 may be wound such that the magnetic field that is generated around the first coil winding portion 141b faces the rotary shaft 110. Further, the coils 143 may be wound such that the magnetic field that is generated around the second coil winding portion 141c faces away from the rotary shaft 110.

In the magnetic bearings 141, a coil may be wound on each of the first coil winding portion 141b and the second coil winding portion 141c or one coil 143 may be wound on both of the first coil winding portion 141b and the second coil winding portion 141c.

The magnetic field of the magnetic bearings 141 may be generated in one direction around the magnetic bearings 141. When a coil 143 is wound clockwise on the first coil winding portion 141b, a coil 143 may be wound counterclockwise on the second coil winding portion 141c. This configuration is just an example and the coils may be wound in any type as long as a magnetic field is formed in one direction inside the magnetic bearings 141.

On the other hand, the compressor 100 may further include a thrust bearing 160 for restricting axial vibration of the rotary shaft 110.

The rotary shaft 110 may have rotary shaft blades 111 radially extending from the rotary shaft 110 and the thrust bearing 160 may be disposed close to the rotary shaft blades 111.

The thrust bearing 160 may include a first thrust bearing 161 and a second thrust bearing 162 and covers the rotary shaft blades 111 in the axial direction of the rotary shaft 110. That is, the first thrust bearing 161, the rotary shaft blades 111, and the second thrust bearing 162 may be axially sequentially arranged on the rotary shaft 110. That is, the first thrust bearing 161 and the second thrust bearing 162 can minimize axial vibration of the rotary shaft blades 111.

Figure 2:
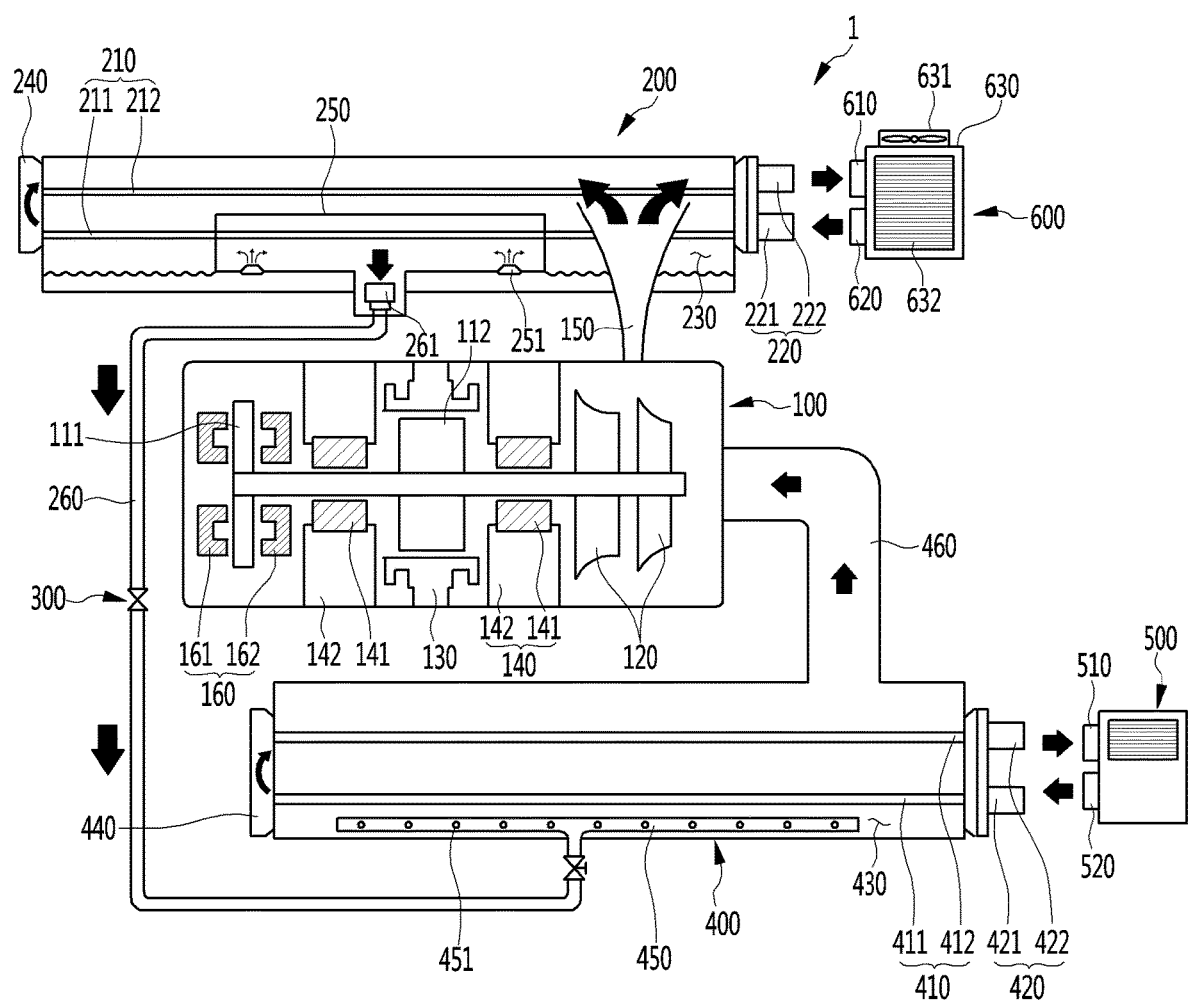
FIG. 2 is a view showing a chiller system according to an embodiment of the present invention.

FIG. 2 is a view showing a chiller system according to an embodiment of the present invention and the chiller system may include the compressor 100 of this embodiment. The compressor 100 may be a part of the chiller system.

The compressor 100 may also be included in an air conditioner and may be included in any apparatus as long as the apparatus compresses a liquid-state substance.

Referring to FIG. 2, a chiller system 1 includes the compressor 100 that compresses a refrigerant, a condenser 200 that condenses a refrigerator through heat exchange between cooling water and the refrigerant compressed by the compressor 100, an expander 300 that expands the refrigerant condensed through the condenser 200, and an evaporator 400 that evaporates a refrigerant and cools cold water through heat exchange between cold water and the refrigerant expanded through the expander 300.

The chiller system 1 may further include a cooling water unit 600 that heats cooling water through heat exchange between the cooling water and the refrigerant condensed through the condenser 200 and an air-conditioning unit 500 that cools cold water through heat exchange between the cold water and the refrigerant expanded through the expander 400.

The condenser 200 can provide a space where the refrigerant compressed at a high pressure through the compressor 100 exchanges heat with the cooling water flowing in the cooling water unit 600, and the refrigerant compressed at a high temperature through the compressor 100 can be condensed by exchanging heat with the cooling water.

The condenser 200 may be a shell-tube type heat exchanger. The refrigerant compressed at a high temperature through the compressor 100 flows into a condensing space 230 corresponding to the internal space of the condenser 200 through a condenser channel 150. A cooling water channel 210 through which the cooling water from the cooling water unit 600 flows may be disposed in the condensing space 230.

The cooling water channel 210 may include a cooling water intake channel 21 through which cooling water from the cooling water unit 600 flows inside and a cooling water discharge channel 212 through which cooling water is discharged to the cooling water unit 600. The cooling water flowing in the cooling water intake channel 211 can exchange heat with a refrigerant in the condensing space 230 and then flow into the cooling water discharge channel 212 through an end inside the condenser 200 or a cooling water connection channel 240 at the outside.

The cooling water unit 600 and the condenser 200 may be connected through a cooling water tube 220. The cooling water tube 220 functions as a passage for cooling water between the cooling water unit 600 and the condenser 200 and may be made of rubber to prevent leakage of the cooling water.

The cooling water tube 220 may include a cooling water intake tube 221 connected to the cooling water intake channel 211 and a cooling water discharge tube 222 connected to the cooling water discharge channel 212.

In the entire flow of cooling water, cooling water that has exchanged heat with air or liquid in the cooling water unit 600 may flow into the condenser 200 through the cooling water intake tube 221. The cooling water flowing in the condenser 200 can exchange heat with the refrigerant flowing in the condenser 200 sequentially through the cooling water intake channel 211, the cooling water connection channel 240, and the cooling water discharge channel 212 and then flow back into the cooling water unit 600 through the cooling water discharge tube 222.

The cooling water that has absorbed heat from the refrigerant through heat exchange in the condenser 200 may be cooled through the cooling water unit 600.

The cooling water unit 600 may have a cooling water intake pipe 610 that is an inlet for the cooling water that has absorbed heat through a main body 630 and the cooling water discharge tube 222 and a cooling water discharge pipe 620 that is an outlet for discharging the cooling water cooled through the cooling water unit 600.

The cooling water unit 600 may be an air cooling device that uses air to cool the cooling water flowing in the main body 630. A fan for generating air flow may be disposed in the main body 630 and the main body 630 may have an air outlet 631 for discharging air and an air inlet 632 for air flowing into the main body 630.

The air discharged from the air outlet 631 after exchanging heat may be used for heating or may be discharged to the atmosphere.

The refrigerant that has exchanged heat through the condenser 200 may be condensed and remain at the lower portion in the condensing space 230. Further, the refrigerant may flow into a refrigerant box in the condensing space 230 and then flow to the expander 300.

The refrigerant flowing in the refrigerant box 250 may flow into a refrigerant intake port 251 and then may be discharged to an evaporator channel 260. The evaporator channel 260 may have an evaporator channel intake port 261 and the evaporator channel intake port 261 may be disposed at the lower portion of the refrigerant box 250.

The evaporator 400 may have an evaporation space 430 where heat is exchanged between cold water and the refrigerant expanded through the expander 300. The refrigerant that has passed through the expander 300 in the evaporator channel 260 can flow to a refrigerator spray unit 450 in the evaporator 400 and can be uniformly sprayed into the evaporator 400 through refrigerant spray holes 451 of the refrigerant spray unit 450.

A cold water channel 410 that includes a cold water intake channel 411 through which cold water flows into the evaporator 400 and a cold water discharge channel 412 through which cold water is discharged out of the evaporator 400 may be disposed in the evaporator 400.

Cold water can flow inside or can be discharged outside through a cold water tube 420 that communicates with the air-conditioning unit 500 disposed outside the evaporator 400. The cold water tube 420 may include a cold water intake tube 421 that is a passage for cold water flowing to the evaporator 400 from the air-conditioning unit 500 and a cold water discharge tube 422 that is a passage for cold water flowing to the air-conditioning unit 500 after exchanging heat through the evaporator 400. The cold water intake tube 421 may communicate with the cold water intake channel 411 and the cold water discharge tube 422 may communicate with the cold water discharge channel 412.

In the flow of cold water, the cold water may pass through a cold water connection channel 440 disposed at an end inside the evaporator 400 or disposed outside the evaporator 400 through the air-conditioning unit 500, the cold water intake tube 421, and the cold water intake channel 411, and then may flow back to the air-conditioning unit 500 through the cold water discharge channel 412 and the cold water discharge tube 422.

The cold water cooled through the evaporator 400 allows for cooling by absorbing the heat of air in the air-conditioning unit 500. The air-conditioning unit 500 may have a cold water discharge pipe 520 that communicates with the cold water intake tube 421 and a cold water intake pipe 510 that communicates with the cold water discharge tube 422. The refrigerant that has exchanged heat through the evaporator 400 flows back into the compressor 100 through a compressor channel 460.

In the flow of a refrigerant in the compressor 100, the refrigerant flowing in the compressor 100 through the compressor channel 460 may be circumferentially compressed and then discharged to the condenser channel 150 by the impeller 120. The compressor channel 460 may be connected to the compressor 100 so that a refrigerant can flow to the impeller 120.

Referring to FIG. 2, the magnetic bearing 141 may be disposed around the rotary shaft 110, that is, at least two positions around the rotary shaft 110. The two positions may be different positions determined in the longitudinal direction of the rotary shaft 110. The magnetic bearings 141 can support the rotary shaft 110 in the air at at least two positions in the longitudinal direction of the rotary shaft 110 and can minimize circumferential vibration of the rotary shaft 110.

FIG. 3 is a view showing normal wire connection of a magnetic bearing according to an embodiment of the present invention, in which wires (hereafter, referred to as lead wires) for applying a current to the coils 143 wound on the first coil winding portion 141$b$ and the second coil winding portion 141$c$ are normally connected to the coils 143.

FIG. 3 shows a radially cut cross-section of the rotary shaft 110 and the magnetic bearings 141, in which the magnetic bearing 141 may be disposed around the rotary shaft 110.

Normal wire connection may mean a case in which lead wires are connected to the coils 143 so that a magnetic field that sequentially passes the first coil winding portion 141b, the magnetic bearing body 141a, and the second coil winding portion 141c can be generated.

When the lead wires are connected in the wrong way, the magnetic field in the magnetic bearings 141 may be generated in the opposite direction, which may mean abnormal wire connection of the magnetic bearings. When the lead wires are connected in the wrong way, a magnetic field sequentially passing the second coil winding portion 141c, the first coil winding portion 141b, and the magnetic body 141a may be generated, which may abnormal wire connection of a magnetic bearing.

However, when the magnetic bearing 141 is turned over at 180° even though a magnetic field changes in the opposite direction to the normal wire connection, it may be normal wire connection.

FIG. 3 shows an example in which coils 143 are normally wound and the magnetic bearings 141 are normally installed around the rotary shaft 110.

When the coils 143 are not normally wound, magnetic fields may not be formed in one direction in the magnetic bearings 141. For example, the magnetic pole generated at the portion, which is close to the rotary shaft, of the first coil winding portion 141b and the magnetic pole generated at the portion, which is close to the rotary shaft, of the second coil winding portion 141c may be the same, in which a magnetic field is generated in one direction in the magnetic bearing 141.

When a magnetic bearing 141 is not normally installed around the rotary shaft 110, the poles of the magnetic bearing 141 not normally installed may not fit to the magnetic poles of another adjacent magnetic bearing 141 even if coils 143 are normally wound and the lead wires are normally connected. In this case, the magnetic bearing 141 of which the magnetic poles do not fit to those of another magnetic bearing 141 may have been turned over at 180°, which may be abnormal wire connection.

The case in which magnetic bearings 141 are normally installed is described hereafter with reference to FIG. 3.

A plurality of magnetic bearings 141 may be arranged in one plane, and the first coil winding portion 141b of any one magnetic bearing 141 and the first coil winding portion 141b of another adjacent magnetic bearing may generate the same magnetic pole.

As shown in FIG. 3, a magnetic field may be generated in one direction in a magnetic bearing 141 and the arrangement of magnetic poles N and S may be defined as corresponding to normal wire connection. Normal wire connection is defined under the assumption that a magnetic field sequentially flows through the first coil winding portion 141b, the magnetic bearing body 141a, and the second coil winding portion 141c, which may mean the same poles are generated at the adjacent portions of adjacent magnetic bearings 141, as shown in FIG. 3.

In FIG. 3, four magnetic bearings 141 are symmetrically arranged around the rotary shaft 110. The magnetic bearings 141 may be installed adjacent to each other around the rotary shaft 110 and may be arranged in the same plane. In this case, the magnetic bearings 141 may stably support the rotary shaft 110 in the air.

In normal wire connection of the magnetic bearings, the first coil winding portion 141b of any one magnetic bearing 141 may be adjacent to the first coil winding portion 141b of another adjacent magnetic bearing 141.

That is, the first coil winding portion 141b of any one magnetic bearing 141 may be adjacent to the first coil winding portion 141b of another adjacent magnetic bearing 141, and the second coil winding portion 141c of the magnetic bearing 141 may be adjacent to the second coil winding portion 141c of the adjacent magnetic bearing 141.

In normal wire connection of the magnetic bearings 141, magnetic poles N and S may be generated at the magnetic bearings 141, as shown in FIG. 3, in which the adjacent first coil winding portions 141b may have the same pole S and the adjacent second coil winding portions 141c may have the same magnetic pole N.

When the magnetic bearings 141 are abnormally installed, the first coil winding portion 141b of any one magnetic bearing 141 may be adjacent to the second coil winding portion 141c of another adjacent magnetic bearing 141.

That is, normal wire connection may correspond to a case satisfying the following three conditions. First, it may be a case in which a magnetic field sequentially flows through the first coil winding portion 141b, the magnetic bearing body 141a, and the second coil winding portion 141c.

Second, it may be a case in which the first coil winding portion 141b of any one magnetic bearing 141 may be adjacent to the first coil winding portion 141b of another adjacent magnetic bearing 141.

Third, it may be a case in which the same poles are generated at adjacent first coil winding portions 141b.

If a magnetic bearing 141 does not satisfy even only one of the three conditions, it may be determined as abnormal wire connection of a magnetic bearing.

Figure 4:
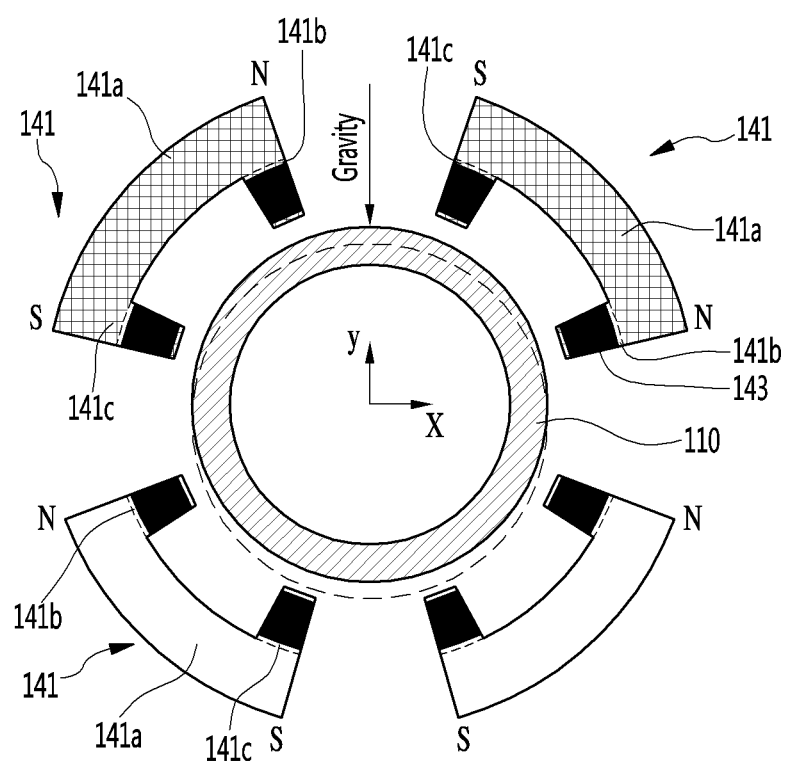
FIG. 4 is a view showing abnormal wire connection of the magnetic bearings according to an embodiment of the present invention.

FIG. 4 is a view showing abnormal wire connection of the magnetic bearings according to an embodiment of the present invention.

The abnormal wire connection of a magnetic bearing may be a case that does not satisfy at least one of the three conditions for the normal wire connection and may be a case in which the currents applied to the coils 143 may be abnormal, unlike FIG. 3.

The abnormal wire connection of a magnetic bearing may be a case in which the coils 143 of any one of the magnetic bearings 141 shown in FIG. 4 are abnormally wound. Further, the abnormal wire connection of a magnetic bearing may be a case in which a magnetic bearing 141 has been turned over around the rotary shaft 110.

When the magnetic poles N and S are generated at the magnetic bearings 141, as shown in FIG. 4, it may be determined as abnormal wire connection.

The abnormal wire connection may be the following three cases.

First, it is a case in which a magnetic bearing 141 is normally installed and coils 143 are normally wound, but wires for supplying a current to the coils are connected in the wrong way, so currents flow in the wrong way. That is, a magnetic field does not sequentially flow through the first coil winding portion 141b, the magnetic bearing body 141a, and the second coil winding portion 141c, but may sequentially flow through the second coil winding portion 141c, the magnetic bearing body 141a, and the first coil winding portion 141b.

Second, it may be a case in which the coils 143 are normally wound and wire for supplying a current to the coils 143 are normally connected, but any one of the magnetic bearings 141 has been turned over at 180°.

Third, it may be a case in which a magnetic bearing 141 is normally installed and wires for supplying a current to the coils 143 are normally connected, but the coils 143 are wound in the opposite direction.

As described above, a method of determining whether it is abnormal wire connection or normal wire connection in the compressor 100 is described hereafter on the basis of the defined normal wire connection and abnormal wire connection.

Figure 5:
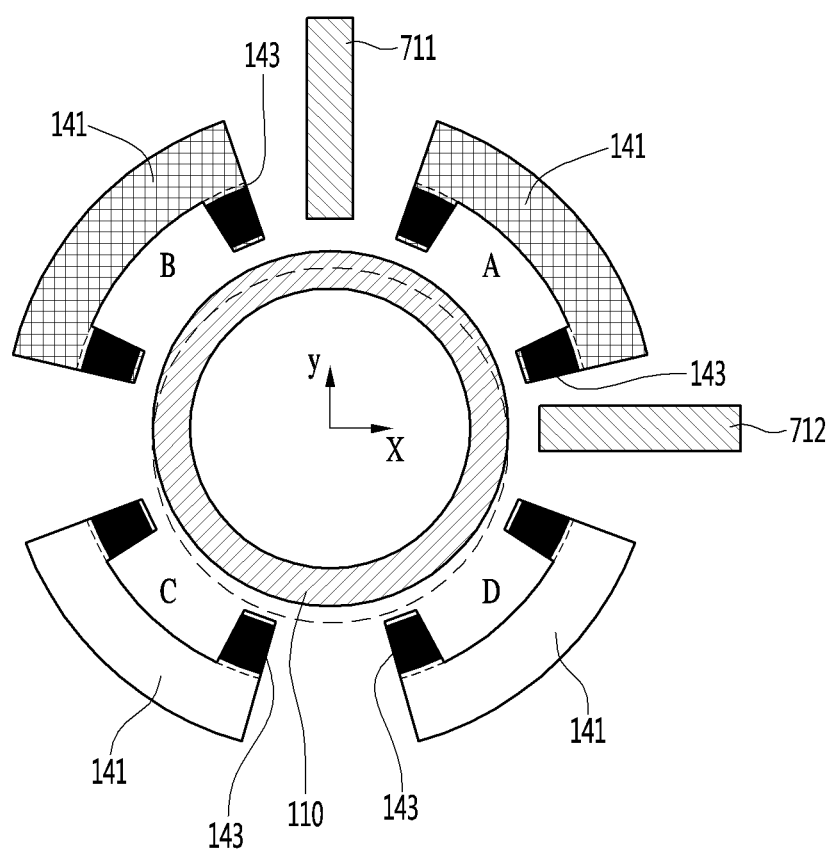
FIG. 5 is a view showing a gap sensor mounted on a compressor according to an embodiment of the present invention.

FIG. 5 shows a gap sensor mounted on the compressor according to an embodiment of the present invention, in which a gap sensor 710 is connected to a controller 700 and a plurality of bearings 141 is arranged.

The gap sensor 710 may include a pair of gap sensors 711 and 712 for sensing movement in perpendicular directions X and Y.

The gap sensor 710 may include a first sensor 711 for measuring movement in a first direction and a second sensor 712 for measuring movement in a second direction, in which the first direction (Y-direction) and the second direction (X-direction) may be perpendicular to each other.

For example, the first gap sensor 711 may be disposed to measure vertical movement of the rotary shaft 110 and the second gap sensor 712 may be disposed to measure horizontal movement of the rotary shaft 110.

As long as the measurement directions X and Y of the fir gap sensor 711 and the second gap sensor 712 are perpendicular to each other, the measurement directions are not limited to the vertical and horizontal directions.

The controller 700 can controls the amount of a current that is supplied to any one of the magnetic bearings 141 to determine whether there is abnormal wire connection, and can determine whether there is abnormal wire connection or normal wire connection of a bearing 141 on the basis of position change information of the rotary shaft 110 measured by the gap sensor 710.

When the compressor 100 includes four magnetic bearings 141, the controller can supply a current to two adjacent magnetic bearings 141 of the magnetic bearings. For example, a current can be supplied to the two upper magnetic bearings 141 in FIG. 5.

In order to distinguish the magnetic bearings 141 shown in FIG. 5, reference characters are given to the magnetic bearings 141 shown in FIG. 5, and the magnetic bearings 14 are distinguished as a magnetic bearing A, a magnetic bearing B, a magnetic bearing C, and a magnetic bearing D in the following description.

For example, the first gap sensor 711 may be disposed between the magnetic bearing A and the magnetic bearing B and can measure vertical (Y-axial) movement and position of the rotary shaft 110. The second gap sensor 712 may be disposed between the magnetic bearing A and the magnetic bearing D and can measure horizontal (X-axial) movement and position of the rotary shaft 110.

Alternatively, the first gap sensor 711 may be disposed between the magnetic bearing C and the magnetic bearing D and can measure vertical (Y-axial) movement and position of the rotary shaft 110. The second gap sensor 712 may be disposed between the magnetic bearing B and the magnetic bearing C and can measure horizontal (X-axial) movement and position of the rotary shaft 110.

When the controller 700 (see FIG. 15) supplies a current to the magnetic bearing A and the magnetic bearing B and then changes the current supplied to any one of the two magnetic bearings, the gap sensor 710 can measure the movement and position of the rotary shaft 110 and the controller 700 can determine whether there is abnormal wire connection on the basis of the measured information.

Figure 6:
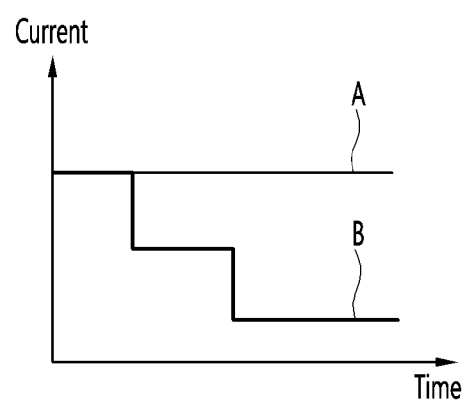
FIG. 6 is a view showing the magnitudes of currents respectively applied to two magnetic bearings according to an embodiment of the present invention.

FIG. 6 is a view showing the magnitudes of currents respectively applied to two magnetic bearings according to an embodiment of the present invention.

FIG. 6 shows a change in magnitude of a current when the current supplied to any one of the magnetic bearing A and the magnetic bearing B is changed as time passes.

Referring to FIG. 6, the controller 700 can supply the same amount of current to the two magnetic bearings A and B in the early stage of determining whether there is normal wire connection or abnormal wire connection. While the same amount of current is supplied to the two magnetic bearings A and B, the first gap sensor 711 and the second gap sensor 712 can separately measure the position of the rotary shaft 110. Further, the controller 700 can reduce step by step the current supplied to any one of the two magnetic bearings A and B, for example, the magnetic bearing B, as time passes.

The controller 700 can reduce step by step the current supplied to the magnetic bearing B when reducing the current applied to the magnetic bearing B, and it can measure the position of the rotary shaft 110 using the first gap sensor 711 and the second gap sensor 712 every time the current is reduced step by step.

Figure 7:
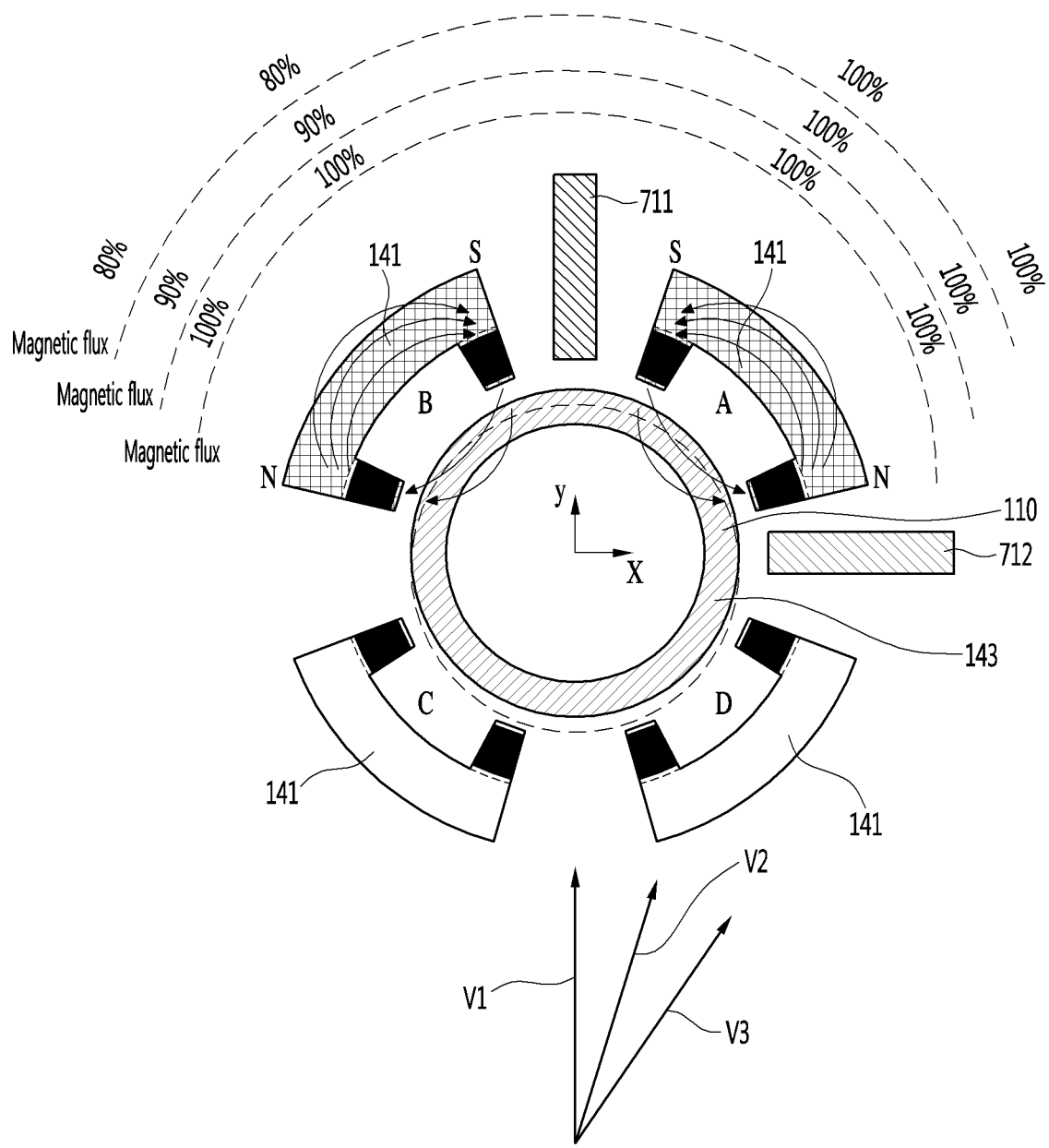
FIG. 7 is a view showing magnetic fields around magnetic bearings in normal wire connection of the magnetic bearings.
Figure 8:
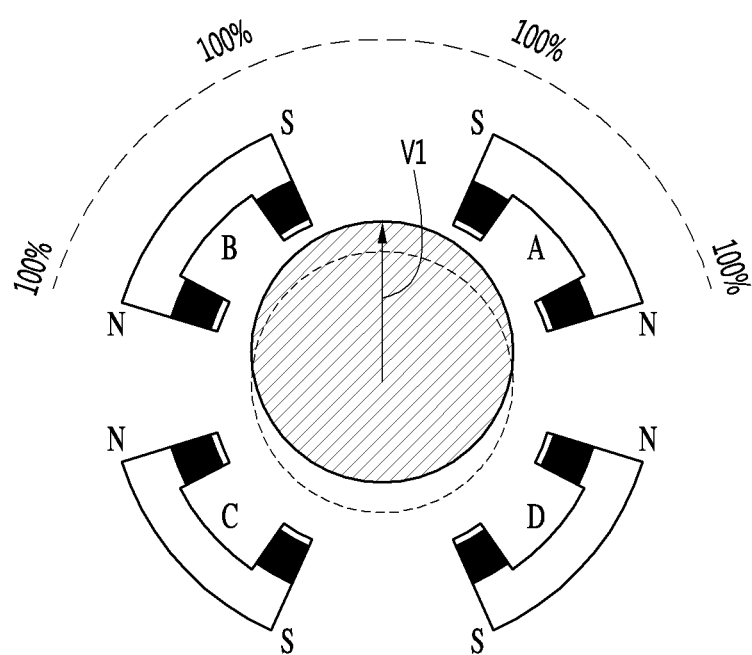
FIG. 8 is a view showing the position and the vector direction of a rotary shaft when the same amount of current is applied to the two magnetic bearings shown in FIG. 7.
Figure 9:
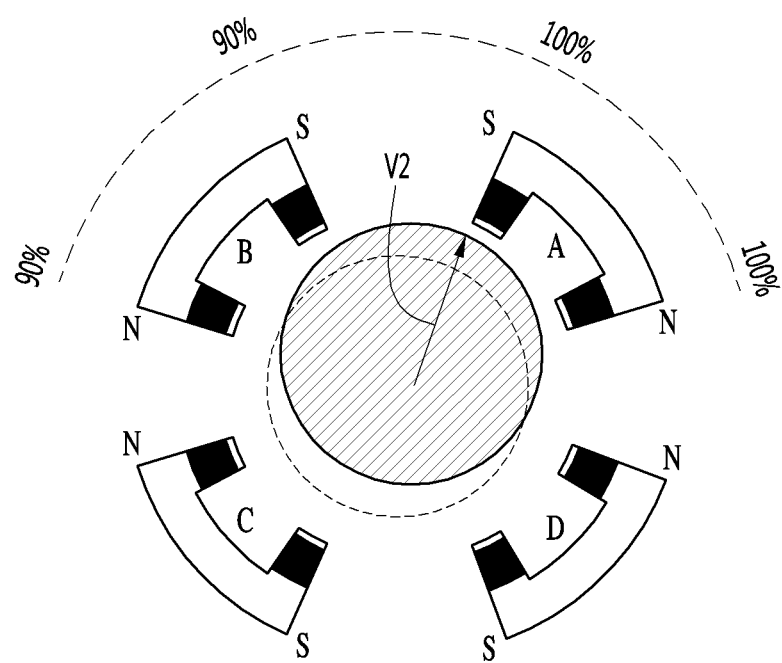
FIG. 9 is a view showing the position and the vector direction of the rotary shaft when the amount of current applied to any one of the two magnetic bearings shown in FIG. 8 is reduced.
Figure 10:
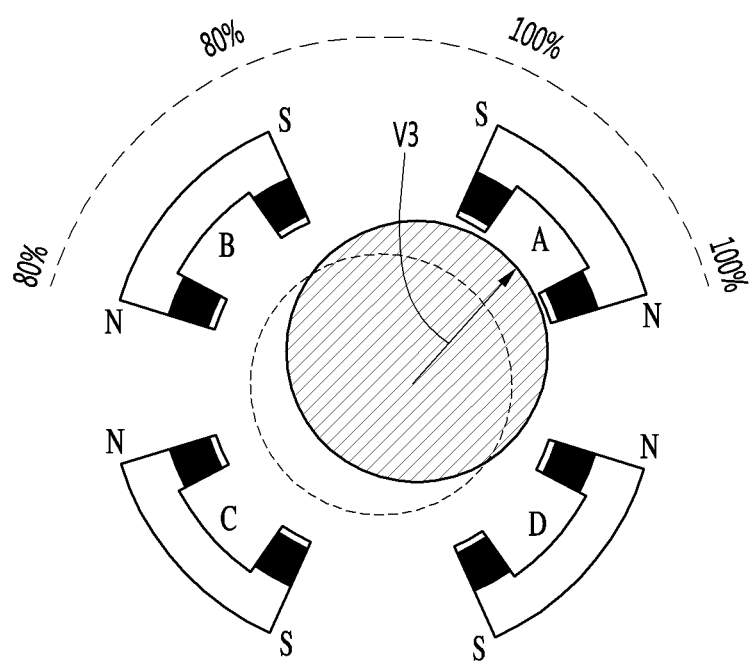
FIG. 10 is a view showing the position and the vector direction of the rotary shaft when the reduced amount of current applied to any one of the two magnetic bearings shown in FIG. 8 is further reduced.

FIG. 7 is a view showing magnetic fields around a plurality of magnetic bearings in normal wire connection of the magnetic bearings, FIG. 8 is a view showing the position and the vector direction of a rotary shaft when the same amount of current is applied to the two magnetic bearings shown in FIG. 7, FIG. 9 is a view showing the position and the vector direction of the rotary shaft when the amount of current applied to any one of the two magnetic bearings shown in FIG. 8 is reduced, and FIG. 10 is a view showing the position and the vector direction of the rotary shaft when the reduced amount of current applied to any one of the two magnetic bearings shown in FIG. 8 is further reduced.

FIG. 7 shows magnetic fields around two magnetic bearings in normal wire connection of a plurality of magnetic bearings, in which a current is applied to the magnetic bearing A and the magnetic bearing B, as shown in FIG. 6, in normal wire connection of a plurality of magnetic bearings.

FIG. 8 shows a case in which the same amount of current is applied to the magnetic bearing A and the magnetic bearing B, in which a magnetic field may flow through the magnetic bearing A and the magnetic bearing B by a current and the rotary shaft 110 that is a conductor may be lifted in the Y-direction by the magnetic bearing A and the magnetic bearing B.

Thereafter, when the amount of current applied to the magnetic bearing B is primarily reduced, the magnetic field flowing through the magnetic bearing B decreases and the rotary shaft 110 may be lifted, as shown in FIGS. 8 and 9. When the amount of current applied to the magnetic bearing B is reduced, the rotary shaft 110 can be lifted close to the magnetic bearing A of the magnetic bearing A and the magnetic bearing B (that is, in the X-axial direction and the Y-axial direction).

With the rotary shaft 110 positioned, as shown in FIG. 8, the controller 700 may reduce the current applied to the magnetic bearing B by one step and the magnetic flux of the magnetic bearing B may be reduced by 10%, as compared with when the same amount of current is supplied to the magnetic bearing A and the magnetic bearing B.

Thereafter, the amount of current applied to the magnetic bearing B is further reduced by one step from the amount show in FIG. 8, the magnetic field flowing through the magnetic bearing B may be further decreased and the rotary shaft 110 may be lifted closer to the magnetic bearing A (that is, in the X-axial direction and the Y-axial direction), as shown in FIGS. 9 and 10.

With the rotary shaft 110 positioned, as shown in FIG. 9, the controller 700 may further reduce the current applied to the magnetic bearing B by one step and the magnetic flux of the magnetic bearing B may be reduced by 20%, as compared with when the same amount of current is supplied to the magnetic bearing A and the magnetic bearing B.

Meanwhile, as shown in FIGS. 7 to 10, in normal wire connection of magnetic bearings, the magnetic force lines generated around the second coil winding portion 141c (having an S-pole) of the magnetic bearing A cannot reach the adjacent magnetic bearing B. This is because the portion, which is close to the magnetic bearing A, of the magnetic bearing B has the same pole in normal wire connection of magnetic bearings. That is, a magnetic force line cannot reach the same poles.

When the current applied to the magnetic bearing B is reduced, only the magnetic force lines around the magnetic bearing B may be reduced, as shown in FIG. 7.

In normal wire connection of magnetic bearings, even though the amount of current applied to the magnetic bearing B is reduced, the magnetic flux around the portion (the coil winding portion having an N-pole), which is close to the magnetic bearing A, of the magnetic bearing A is not reduced. Accordingly, while the amount of current applied to the magnetic bearing B is reduced step by step, the rotary shaft 110 can be gradually lifted close to the magnetic bearing A.

When the position of the rotary shaft 110 is changed, as described above, the values that are measured by the first gap sensor 711 may be gradually reduced and the values that are measured by the second gap sensor 712 may be gradually reduced.

As a result, when the current applied to any one of a pair of adjacent magnetic bearings A and B is reduced, the center vector of the rotary shaft 110 gradually inclines toward the magnetic bearing A that keeps being supplied with a predetermined amount of current of the adjacent magnetic bearings A and B.

The movement of the rotary shaft 110 in normal wire connection of magnetic bearings is described in detail hereafter.

In normal wire connection, as shown in FIGS. 7 to 10, the adjacent coil winding portions of the magnetic bearing B and the magnetic bearing A may have the same pole.

That is, the adjacent portions of the two magnetic bearings A and B have the same pole, a magnetic field dose not flow between the magnetic bearing A and the magnetic bearing B, and the magnetic field around the magnetic bearing A is not influenced even if the current flowing in the magnetic bearing B gradually reduces. Accordingly, the rotary shaft 110 is gradually moved toward the magnetic bearing A keeping the magnetic field at a predetermined level.

FIGS. 8 to 10 show that the amount of current applied to the magnetic bearing B is reduced through three steps in normal wire connection of magnetic bearings.

The arrows V1, V2, and V2 shown in FIGS. 7 to 10 mean the center vector of the rotary shaft 10 for the convenience of description, and it can be seen that the center vectors V1, V2, and V3 gradually incline toward the magnetic bearing A, as the amount of current applied to the magnetic bearing B is gradually reduced.

The position and the center vector V1 of the rotary vector 110 when the same amount of current flows in the magnetic bearing A and the magnetic bearing B are shown in FIG. 8.

Further, the position and the center vector V2 of the rotary shaft 110 when the amount of current applied to the magnetic bearing B is reduced by one step are shown in FIG. 9.

Further, the position and the center vector V2 of the rotary shaft 110 when the amount of current applied to the magnetic bearing B is reduced by two steps are shown in FIG. 10.

Referring to FIGS. 8 to 19, every time the amount of current applied to the magnetic bearing B is reduced, the height of the rotary shaft 110 may be gradually increased and the center of the rotary shaft 110 may be gradually moved closer to the magnetic bearing A. That is, the center vectors V1, V2, and V3 of the rotary vector 110 may gradually incline toward the magnetic bearing A and gradually reduce in magnitude.

Figure 11:
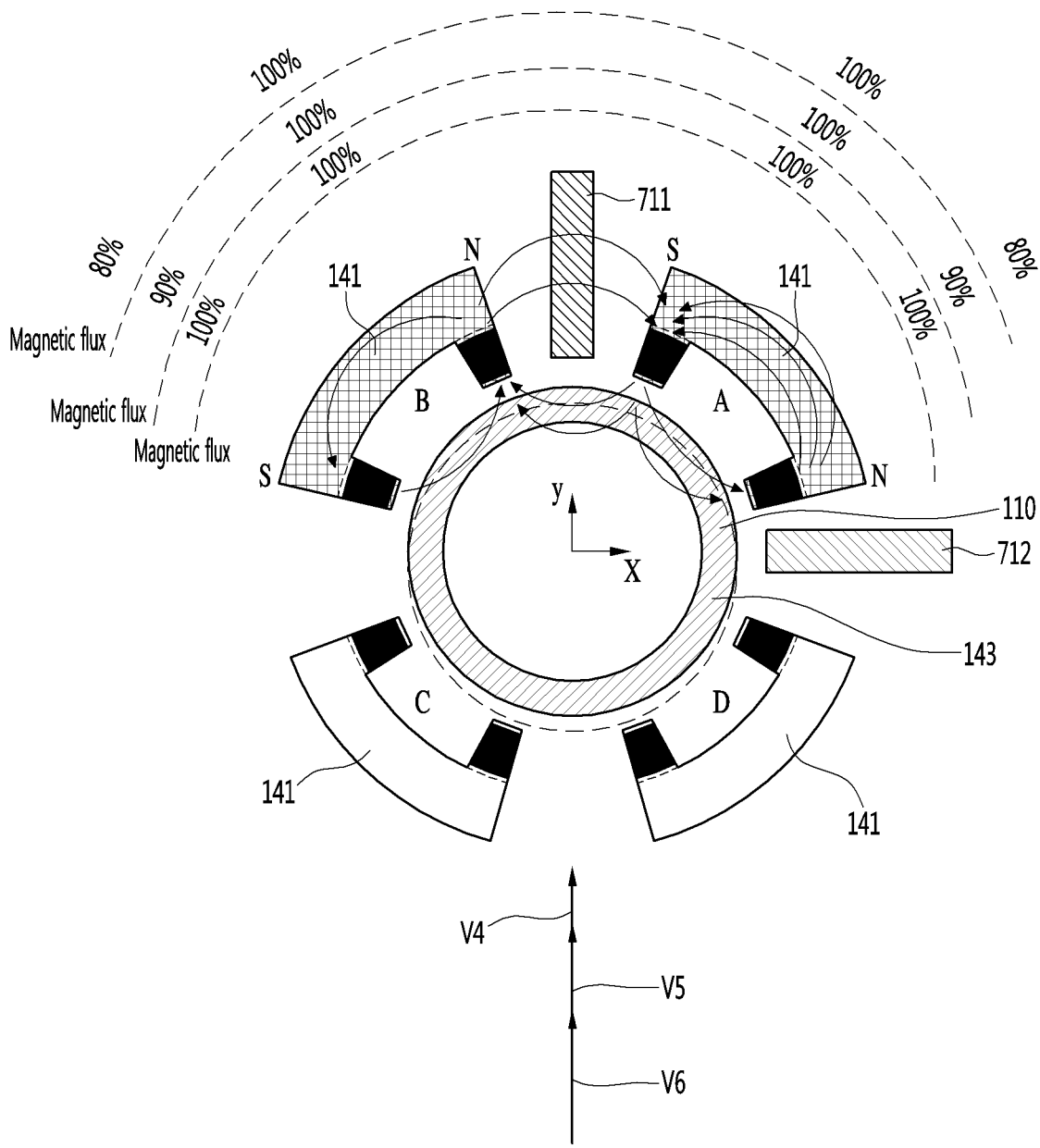
FIG. 11 is a view showing the magnetic field around a magnetic bearing in abnormal wire connection of the magnetic bearing.
Figure 12:
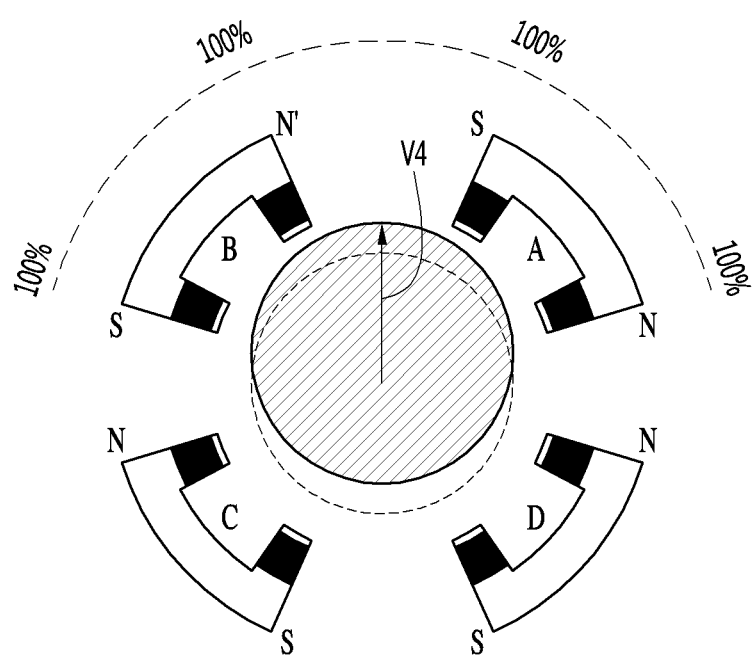
FIG. 12 is a view showing the position and the vector direction of a rotary shaft when the same amount of current is applied to the two magnetic bearings shown in FIG. 11.
Figure 13:
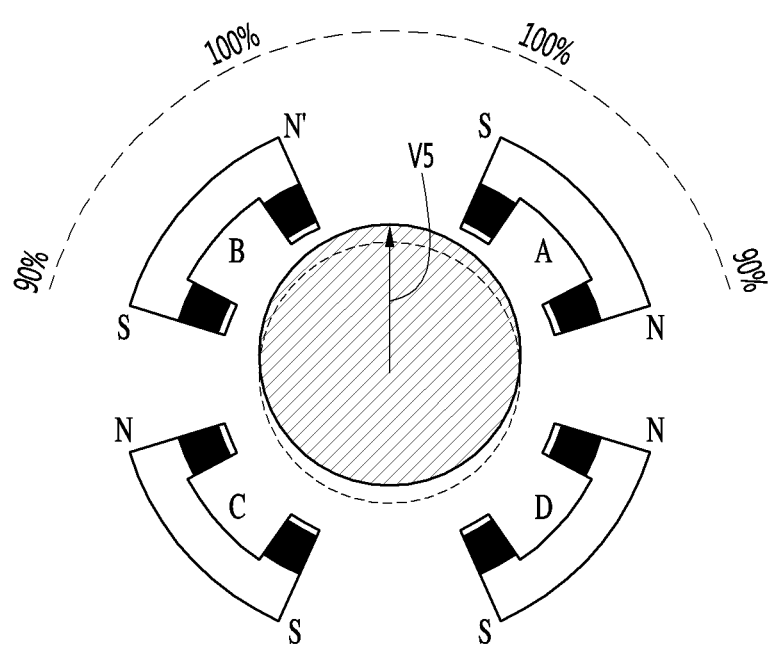
FIG. 13 is a view showing the position and the vector direction of the rotary shaft when the amount of current applied to any one of the two magnetic bearings shown in FIG. 12 is reduced.
Figure 14:
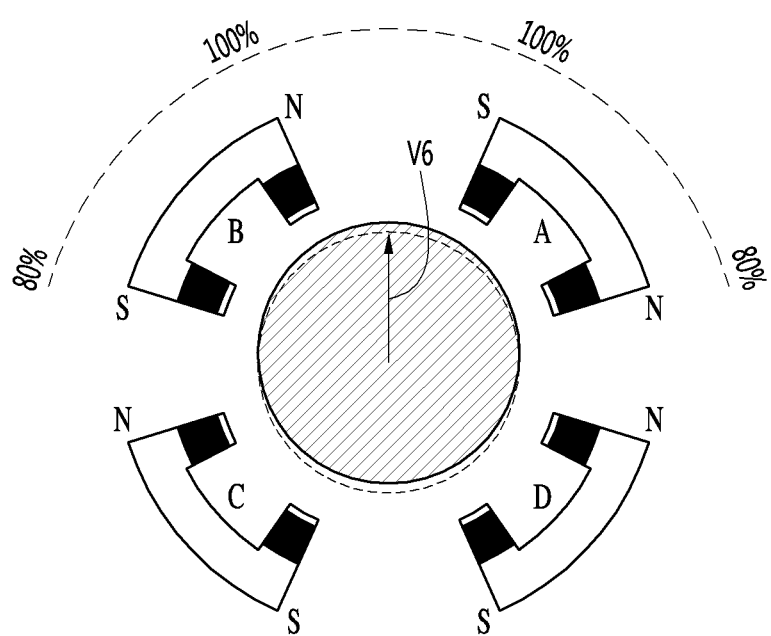
FIG. 14 is a view showing the position and the vector direction of the rotary shaft when the reduced amount of current applied to any one of the two magnetic bearings shown in FIG. 12 is further reduced.

FIG. 11 is a view showing magnetic fields around a plurality of magnetic bearings in abnormal wire connection of the magnetic bearings, FIG. 12 is a view showing the position and the vector direction of a rotary shaft when the same amount of current is applied to the two magnetic bearings shown in FIG. 11, FIG. 13 is a view showing the position and the vector direction of the rotary shaft when the amount of current applied to any one of the two magnetic bearings shown in FIG. 12 is reduced, and FIG. 14 is a view showing the position and the vector direction of the rotary shaft when the reduced amount of current applied to any one of the two magnetic bearings shown in FIG. 12 is further reduced.

FIG. 11 shows magnetic fields around two magnetic bearings in abnormal wire connection of any one of a plurality of magnetic bearings, in which there is abnormal wire connection in any one of the magnetic bearings and a current is supplied to the magnetic bearing A and the magnetic bearing B, as in FIG. 6.

FIG. 11 shows a case in which any one of a plurality of bearings A, B, C, and D, for example, the magnetic bearing B has been turned over at 180° under the assumption that coils 143 are normally wound on the magnetic bearings A, B, C, and D and wires for supplying a current to the coils 143 are normally connected.

In this case, the second coil winding portion 141c of the magnetic bearing A and the first coil winding portion 141b of the magnetic bearing B may be adjacent to each other, and the adjacent portions of the magnetic bearing A and the magnetic bearing B may have different poles, as shown in FIG. 11.

FIG. 12 shows a case in which the same amount of current is applied to the magnetic bearing A and the magnetic bearing B, in which a magnetic field may be generated around the magnetic bearing A by the current flowing in the magnetic bearing A, a magnetic field may be generated around the magnetic bearing B by the current flowing in the magnetic bearing B, and the rotary shaft 110 that is a conductor may be lifted in the Y-axial direction by the magnetic field around the magnetic bearing A and the magnetic field around the magnetic bearing B.

Thereafter, as shown in FIG. 13, when the amount of current applied to the magnetic bearing B is primarily reduced, the magnetic field flowing through the magnetic bearing B may be further reduced than that shown in FIG. 12 and the magnetic flux is also reduced. In this case, some of the magnetic force lines generated at the second coil winding portion 141c (having an S-pole) of the magnetic bearing A, as shown in FIG. 11, goes to the first coil winding portion 141b (having an N-pole) of the adjacent magnetic bearing B.

Further, as in FIG. 14, when the amount of current applied to the magnetic bearing is further reduced, the magnetic field flowing through the magnetic bearing B may be further reduced than that shown in FIG. 13 and the magnetic flux is also reduced.

In this case, some of the magnetic force lines generated at the second coil winding portion 141c (having an S-pole) of the magnetic bearing A, as shown in FIG. 11, goes to the first coil winding portion 141b (having an N-pole) of the adjacent magnetic bearing B.

When there is abnormal wire connection in the magnetic bearing B, as described above, and the current applied to any one of the adjacent magnetic bearings A and B is reduced, the center vector of the rotary shaft 110 may be maintained without changing the direction.

Magnetic force lines may be formed thick around the coil winding portion, which is adjacent to the magnetic bearing B, of the magnetic bearing A and the coil winding portion, which is adjacent to the magnetic bearing A, of the magnetic bearing B. However, magnetic force lines may be formed relatively small around the coil winding portions that are not adjacent to each other.

Accordingly, when the amount of current flowing in the magnetic bearing B is reduced, the center vector of the rotary shaft 110 may face the Y-axial direction, unlike in the normal wire connection. However, since the amount of current that is supplied to the magnetic bearing B is reduced, the numbers of the entire magnetic force lines around the magnetic bearing A and the magnetic bearing B may be decreased and the magnitude of the center vector V5 of the rotary shaft 110 may be smaller than that of the center vector V4 when the same amount of current is applied to the magnetic bearing A and the magnetic bearing B.

The case shown in FIG. 14 is generated in the same way as that shown in FIG. 13, in which the center vector of the rotary shaft 110 is maintained in the Y-axial direction, but the magnitude of the center vector V6 of the rotary shaft 110 may be smaller than that shown in FIG. 13.

As the amount of current applied to the magnetic bearing B is gradually reduced, the rotary shaft 110 may be gradually moved down, and the center vectors of the rotary shaft 110 are not changed in direction, but may be changed in magnitude.

Figure 15:
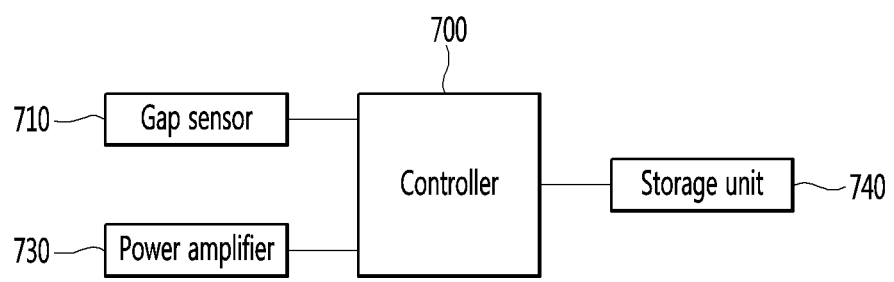
FIG. 15 is a block diagram showing the relationship of a controller and components connected to the controller.

The values measured by the first gap sensor 711 and the second gap sensor 712 in normal wire connection of the magnetic bearings 141 may be stored in advance in a storage unit 740 (see FIG. 15).

The controller 700 can determine whether there is abnormal wire connection by comparing the stored data with data collected by the first gap sensor 711 and the second gap sensor 712. For example, the changes measured by the second gap sensor 712 due to phased changes of a current in normal wire connection may be larger than the changes measured by the second gap sensor 712 due to phased changes of a current in abnormal wire connection. When a change measured by the second gap sensor 712 is smaller than a change of data stored in normal wire connection, it can be determined as abnormal wire connection.

However, all of the values measured in normal wire connection and in abnormal wire connection may be stored. That is, it is possible to determine whether there is abnormal wire connection by comparing the measured values with the stored values.

FIG. 15 is a block diagram showing the relationship of a controller and components connected to the controller.

FIG. 15 is a block diagram showing the operation of the controller 700 and the controller 700 can control the gap sensor 710 and a power amplifier 730 that amplifies the current applied to the magnetic bearings 141.

It is possible to control the magnitude of the currents applied to the magnetic bearings 141 by controlling the power amplifier 730 and it is also possible to find out a positional change of the rotary shaft 110 due to a change in magnitude of a current using the gap sensor 710.

Values measured by the gap sensor 710 may be stored in the storage unit 740. Data for normal wire connection or data for abnormal wire connection may be stored in advance in the storage unit 740. Then, the controller 700 can determine whether there is abnormal wire connection by comparing the measured values with the values stored in advance in the storage unit 740.

In order to determine whether there is abnormal wire connection, it is possible to check all of adjacent magnetic bearings 141 in pairs, including the magnetic bearing A and the magnetic bearing B. For example, it is possible to check whether there is abnormal wire connection while supplying a current only to the magnetic bearing B and the magnetic bearing C. In this case, the method of checking whether there is abnormal wire connection in the magnetic bearings described above is used in the same way, but is not described in detail to avoid repeated description.

On the other hand, this embodiment may provide a control method of determining whether there is abnormal wire connection in the magnetic bearings 141.

Figure 16:
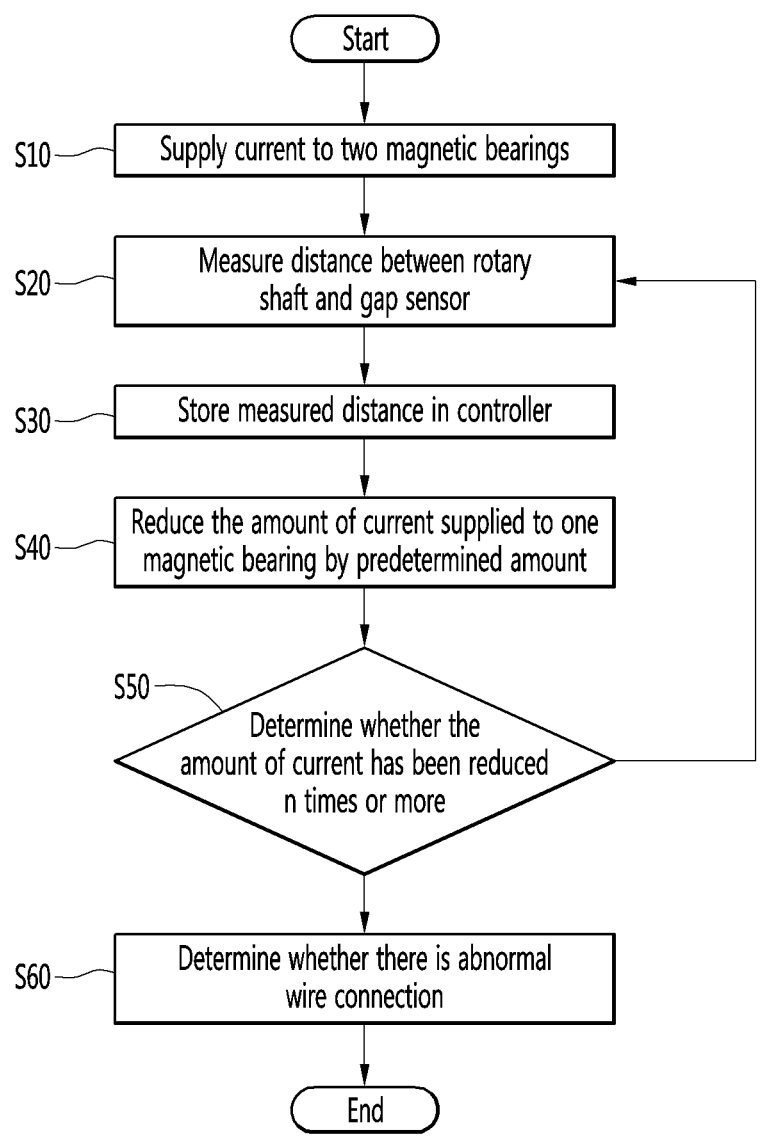
FIG. 16 is a flowchart illustrating a control method according to an embodiment of the present invention.

FIG. 16 is a flowchart illustrating a control method according to an embodiment of the present invention.

A method of controlling a compressor according to an embodiment of the present invention may be a method of a control method of sensing a defect of the compressor 100 that includes: an impeller 120 for compressing a refrigerant; a rotary shaft 110 rotating the impeller 120; a plurality of magnetic bearings 141 supporting the rotary shaft 110 such that the rotary shaft 110 can rotate in the air; a gap sensor 710 for sensing the position of the rotary shaft 110; and a controller 700 determining whether there is abnormal wire connection the magnetic bearings 141.

The method of controlling a compressor of this embodiment may include: supplying a current to two magnetic bearings (S10); measuring the distance between the rotary shaft 110 and the gap sensor 710 (S20); storing the measured distance in the controller 700 (S30); reducing the amount of current supplied to one of the magnetic bearings 141 by a predetermined amount (S40); determining whether the amount of current has been reduced n times (S50); and determining whether there is abnormal wire connection by means of the controller (S60).

The supplying of a current to two magnetic bearings (S10) may be a step of supplying a current to adjacent two magnetic bearings 141. It may be possible not to supply a current to other magnetic bearings except for the two adjacent magnetic bearings 141. The same amount of current may be supplied to the two adjacent magnetic bearings 141.

When a current is supplied to two adjacent magnetic bearings, the rotary shaft 110 can be moved toward the two magnetic bearings by magnetic fields generated by the current. In this process, the gap sensor 710 can measure the distance between the rotary shaft 110 and the gap sensor 710 (S20). The measured data can be stored in the controller 700 (S30). The measured data may be stored in a storage unit 740 connected to the controller 700.

Thereafter, the reducing of the amount of current supplied to any one of the two magnetic bearings by a predetermined amount (S40) can be performed. When the amount of current is reduced by the predetermined amount, the rotary shaft 110 is moved, as described above, depending on whether it is abnormal wire connection or normal wire connection.

Every time the amount of current is reduced by the predetermined amount, it is possible to find out the position of the rotary shaft 110 using the gap sensor 710 and the measured information can be stored in the storage unit 740 by the controller 700.

The step of reducing the amount of current by the predetermined amount may be performed n times. When the amount of current is reduced at least three times, or the position of the rotary shaft 110 is measured several times while the amount of current is gradually reduced, the reliability of the measured values can be improved.

When a plurality of data is obtained while the amount of current is reduced, the controller 700 can determine whether there is abnormal wire connection on the basis of the data (S60).

In order to determine whether there is abnormal wire connection, as described above, it is possible to store in advance data for normal wire connection and abnormal wire connection and then compare measured data with the stored data. Further, it may be possible to store only any one of the data for normal wire connection and abnormal wire connection and then compare measured data.

In detail, when the direction of the center vector of the rotary shaft 110 measured by the first gap sensor 711 and the second gap sensor 712 is changed, the controller 700 can determine that it is normal wire connection. Changes measured by the first gap sensor 711 for the vertical direction and the second gap sensor 712 for the horizontal direction are over a predetermined level, it is possible to determine that the direction of the center vector of the rotary shaft 110 has been changed and that it is normal wire connection.

However, when the first gap sensor 711 senses a change, but the second gap sensor 712 cannot sense a change or senses a change remarkably smaller than the change measured by the first gap sensor 711, it is possible to determine that the direction of the center vector of the rotary shaft 110 has not been changed and the controller 700 can determine that it is abnormal wire connection.

When determining that there is abnormal wire connection in a magnetic bearing, the controller 700 may wait for the compressor 100 to be prepared for operation without operating the compressor 100. In detail, in the chiller system, when the compressor 100 is ready to operate, the controller 700 can send a turning-on signal to the compressor 100, but when it is determined that there is abnormal wire connection, the controller 700 may not transmit the turning-on signal to the compressor 100 even if the compressor 100 is ready to operate. That is, this is for preventing damage to the compressor 100 and increase reliability of the compressor 100.

Further, the controller 700 can transmit the information of abnormal wire connection to the outside through a communication device (not shown). The communication device, which is an external device for controlling the chiller system 1 such as a mobile terminal or a central computer, can transmit information of abnormal wire connection and a manager can check abnormal wire connection through the mobile terminal or the central computer and replace the compressor 100 or the magnetic bearings 141.

Further, the controller 700 can transmit information of abnormal wire connection to a display (not shown) on the compressor 100 or a display (not shown) for showing the information of the chiller system 1 and a manager can check abnormal wire connection through the display and replace the compressor 110 or the magnetic bearings 141.

The present invention may be modified in various ways, so the scope of the present invention is not limited to the embodiments described above. Therefore, modified embodiments should be construed as being included in the scope of the present invention as long as they include the components described in claims.

What is claimed is:

1. A compressor comprising:
   one or more impellers that axially suck and centrifugally compress a refrigerant;
   a rotary shaft that is connected with the impeller and a motor for rotating the impeller;
   a plurality of magnetic bearings that supports the rotary shaft in the air so that the rotary shaft can rotate;
   a gap sensor that senses a distance between the rotary shaft and the gap sensor; and
   a controller that determines an abnormal wire connection of the magnetic bearings on the basis of position change information of the rotary shaft measured by the gap sensor,
   wherein the controller senses movement of the rotary shaft through the gap sensor while controlling the amount of current supplied to any one of the magnetic bearings and determines whether there is the abnormal wire connection on the basis of the position change information of the rotary shaft.

2. The compressor of claim 1, wherein when determining that there is abnormal wire connection in a magnetic bearing, the controller supplies a current to two adjacent magnetic bearings of the magnetic bearings.

3. The compressor of claim 1, wherein the gap sensor is disposed between two adjacent magnetic bearings.

4. The compressor of claim 1, wherein the magnetic bearings each have:
   a magnetic bearing body forming the body of the magnetic bearings;
   a first coil winding portion extending toward the rotary shaft from an end of the magnetic bearing body;
   a second coil winding portion extending toward the rotary shaft from another end of the magnetic bearing body; and
   coils wound on the first coil winding portion and the second coil winding portion and allowing a current to flow.

5. The compressor of claim 2, wherein the controller reduces step by step the current applied to any one of the two adjacent magnetic bearings, and senses the position of the rotary shaft using the gap sensor every time the current is reduced step by step.

6. The compressor of claim 3, wherein the magnetic bearings are arranged around the rotary shaft and at least two gap sensors are installed.

7. The compressor of claim 4, wherein the coils are wound such that a magnetic field generated around the first coil winding portion faces the rotary shaft and a magnetic field generated around the second coil winding portion faces away from the rotary shaft.

8. The compressor of claim 5, wherein the controller reduces step by step the current applied to any one of the two adjacent magnetic bearings after applying the same amount of current to the two adjacent magnetic bearings.

9. The compressor of claim 6, wherein the gap sensor includes:
   a first gap sensor for measuring first-directional movement of the rotary shaft; and a second gap sensor for measuring second-directional movement of the rotary shaft, and the first direction and the second direction are perpendicular to each other.

10. The compressor of claim 7, wherein the first coil winding portion of any one of the magnetic bearings is adjacent to the first coil winding portion of another magnetic bearing.

11. The compressor of claim 9, wherein the controller reduces step by step the current applied to any one of the two adjacent magnetic bearings after applying the same amount of current to the two adjacent magnetic bearings, and when the direction of a center vector of the rotary shaft measured by the first gap sensor and the second gap sensor is changed, the controller determines normal wire connection of the magnetic bearings.

12. The compressor of claim 9, wherein the controller reduces step by step the current applied to any one of the two adjacent magnetic bearings after applying the same amount of current to the two adjacent magnetic bearings, and when the direction of a center vector of the rotary shaft measured by the first gap sensor and the second gap sensor is not changed, the controller determines that there is abnormal wire connection in a magnetic bearing.

13. The compressor of claim 10, wherein when the direction of the magnetic field generated around the first coil winding portion of any one of the magnetic bearings and the direction of the magnetic field generated around the first coil winding portion of another magnetic bearing are the same, the controller determines normal wire connection of the magnetic bearings.

14. The compressor of claim 10, wherein when the direction of the magnetic field generated around the first coil winding portion of any one of the magnetic bearings and the direction of the magnetic field generated around the first coil winding portion of another magnetic bearing are different, the controller determines that there is abnormal wire connection of a magnetic bearing.

15. A method of controlling a compressor for sensing a defect of the compressor including an impeller for compressing a refrigerant, a rotary shaft for rotating the impeller, a gap sensor for sensing a position of the rotary shaft, and a controller determining whether there is an abnormal wire connection in a magnetic bearing, the method comprising:

supplying a current to adjacent two magnetic bearings;

reducing step by step the current supplied to any one of the two magnetic bearings; and measuring the position of the rotary shaft by the gap sensor every time the current is reduced step by step, wherein the controller determines whether there is the abnormal wire connection on the basis of the position of the rotary shaft.

16. The method of claim 15, wherein the amounts of supplied current are the same in the supplying of a current to the adjacent two magnetic bearings.

17. The method of claim 15, wherein the gap sensor includes a first gap sensor for determining first-directional movement of the rotary shaft and a second gap sensor for determining second-directional movement of the rotary shaft, and the first direction and the second direction are perpendicular to each other.

18. The method of claim 17, wherein when the direction of a center vector of the rotary shaft measured by the first gap sensor and the second gap sensor is changed, the controller determines normal wire connection.

19. The method of claim 17, wherein when the direction of a center vector of the rotary shaft measured by the first gap sensor and the second gap sensor is not changed, the controller determines abnormal wire connection.

* * * * *